March 4, 1958 R. F. CHAPMAN 2,825,901
DISPLAY ARRANGEMENT FOR DIRECTION FINDERS
Filed Jan. 5, 1955
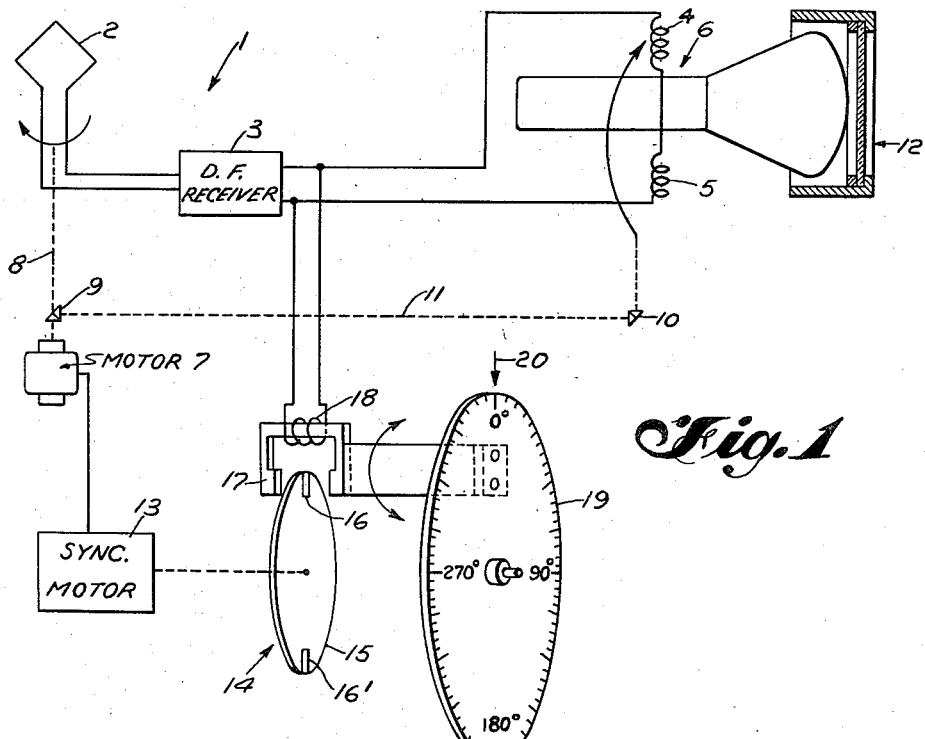
*Fig. 1*
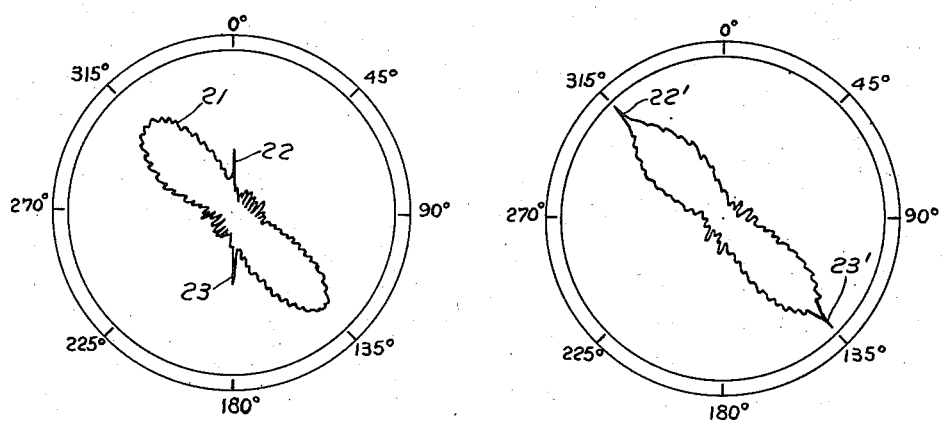
*Fig. 2*   *Fig. 3*
INVENTOR
RICHARD F. CHAPMAN
BY Ernest Fanwick
ATTORNEY

United States Patent Office 2,825,901
Patented Mar. 4, 1958

2,825,901

DISPLAY ARRANGEMENT FOR DIRECTION FINDERS

Richard F. Chapman, Glendale, N. Y., assignor to International Telephone and Telegraph Corporation, Nutley, N. J., a corporation of Maryland Application January 5, 1955, Serial No. 480,023

7 Claims. (Cl. 343—118)

This invention relates to display arrangements for cathode ray tubes and more particularly, though not exclusively, it concerns direction finders of the type utilizing cathode ray tubes wherein an indication in the form of a figure of eight is employed.

In a known type of automatic direction finding system, a figure of eight pattern is produced on the screen of a cathode ray oscilloscope and the angular disposition of the trace gives the bearing of a transmitting beacon or station. The position of the trace on the face of the tube is determined by the angular relation of its outer ends resulting from the radiant action pattern of the antenna system. If the pattern is not sharp, the outer ends of the trace become rounded and also tend to pull in away from the scale which is around the circumference of the screen, thus making accurate readings extremely difficult. In addition if an electrostatic indicator tube is utilized then the position of the trace is affected by any inaccuracy in the construction of the cathode ray tube and according to present practice, the errors caused by inaccuracies are minimized by individual calibration of the indicators. This individual calibration process is rather costly and is furthermore undesirable in view of the limited life of the indicating equipment. Various other causes produce inaccuracies in the reading such as blurring or rounding of the outer ends of the lobed pattern and noise, which for example, tends to mask the lobed pattern and frequently obscures the directional indication.

Another source of error in this system is due to parallax which arises from the fact that the cathode ray tube screen is convex while the indicating scale on which the position of the trace is read is normally flat and, therefore, spaced away from the scale around the edges. Moreover the luminous trace is generally produced on the inner surface of the end of the tube while the scale is usually on the outside. In the case of a large tube the glass may be as much as 1/8" thick or more, thus increasing the difficulty in reading due to parallax.

One object of the present invention is to produce an improved cathode ray tube indicator more easily read than those of the prior art.

Another object of the present invention is the provision of an improved direction finder system giving improved deflection indications in which the usual figure of eight pattern on the screen of the cathode ray tube is aligned with an electronic cursor.

Another object of the present invention is the provision of an improved direction finder system in which accurate directional indications are obtained, in spite of a relatively high noise level and which may be read at a point remote from the cathode ray tube indicator.

One feature of this invention includes a display arrangement for a direction finder system utilizing a cathode ray tube comprising means for producing a circular sweep of the electron beam in synchronism with the azimuthal sweep of the directive radiation pattern of the direction finder system. In addition, an electronic cursor signal is produced in synchronism with the circular rotation or sweep of the electron beam. The phasing of the electronic cursor producing means and the circular sweep means are varied to align the bearing indication pattern and the electronic cursor pattern and the difference in relative phasing is an indication of the bearing of the signal source, and this indication is obtained by the variation in the phasing means rather than any reading from the cathode ray tube.

Such display arrangements may clearly be employed in any system in which measurements are made from the indication or trace produced on the cathode ray screen, the angular position of such indication or trace being the quantity measured. It is, however, a particular application to a radio direction finding system, the embodiment which will be described to illustrate the invention for such a system.

The above-mentioned and other features and objects of this invention will become more apparent by reference to the following description taken in conjunction with the accompanying drawings, in which:

Fig. 1 is a block diagram in schematic form of a direction finder system embodying my invention; and Figs. 2 and 3 show a schematic illustration of the screen of the cathode ray tube indicator utilizing the principles of my invention.

In systems of the type to which this application has particular reference, directive radiant action patterns are effectively rotated and the circular sweep of a cathode ray oscilloscope tube are rotated synchronously therewith. Energy picked up from a signal source produces in the output of the direction finding receiver an indicating voltage waveform which is then coupled to the deflecting means of a cathode ray tube to produce a figure of eight pattern. In accordance with one aspect of my invention a pulse marker generator is provided to produce a second deflection voltage in synchronism with the rotation of the directive radiant action pattern and this is also applied to the deflecting means of the cathode ray tube to cause a thin line radial deflection of the circular trace. This thin line trace or electronic alidade can be varied in position by adjusting the relative phasing between the pulse marker generator means and the rotation of the directive radiant action pattern. The foregoing and other aspects of my invention will become apparent from the following description.

Fig. 1 shows a radio direction finding system 1 of known character, not shown in detail. It includes the necessary antenna system 2 for receiving waves from a signal source and coupling these signals to a direction finding receiving equipment 3 which produces in its output in a known manner deflecting voltages coupled to the deflection coils 4 and 5 of the cathode ray tube indicator 6. However, it will be readily understood that other deflection means can be substituted therefor. The cathode ray tube is of conventional type and the electron gun and operating arrangements are not shown. In place of the rotatable antenna system 2 shown in Fig. 1, a fixed structure with a rotatable goniometer may be used as will be readily understood by those skilled in the art.

The antenna system 2 produces a continuously shifting or rotating radiant action pattern of the form of a figure eight which is produced in response to the rotation of the antenna system 2 driven by motor 7 about a vertical axis as indicated by the mechanical coupling 8. The motor 7 through gearing 9 and 10 and mechanical drive 11 causes the deflection coils 4 and 5 to rotate about the neck of a cathode ray tube 6 causing the electron beam to produce a circular trace on the screen of the tube which when combined with the deflection voltage output of the direction finding receiver 3 produces a figure of eight pattern whose angular position is indicative of the bearing of the signal source from the receiving station. Prior art devices have utilized a mechanical scale 12 associated with the face of a cathode ray tube on which the angular bearing of the figure of eight trace is determined. It is readily apparent from Fig. 1 that due to the convex nature of the face or screen of the cathode ray tube inaccuracies result from the visual determination of the angular bearing of the figure of eight trace.

In accordance with one embodiment of this invention the motor 7, causing the rotation of the directive radiant action pattern which is in synchronism with the rotation of the circular trace of the electron beam, has an output coupled to a synchronous motor 13 which is geared to a magnetic pickup pulse forming unit 14. The pulse forming unit or marker pulse generator comprises a nonmagnetic disk 15 having slots of magnetic material 16 and 16' which when disk 15 is rotated are caused to pass between the pole pieces of a magnet 17 with which a pickup coil 18 is associated. Thus, as magnetic material 16 and 16' pass between pole pieces of the magnet 17, the reluctance of the magnetic circuit is varied causing a voltage pulse to be picked up by coil 18 and coupled to the deflection coils 4 and 5 of the cathode ray tube. This deflection voltage causes two radial deflections of the electron beam trace 180° apart, for each rotation of the antenna pattern and since they are in synchronism with the rotation of the circular trace they will appear to be stationary relative to the bearing angle of the figure of eight trace. The relative position of the radial trace or electric alidade is varied by varying the relative phasing between the magnetic pickup magnet 17 and the direction of the radiant action pattern due to antenna system 2. By rotating the magnet 17 around the periphery of the disk 15, the relative phasing between the drive means 7 and the marker pulse generator 14 is easily obtained. This relative phasing is indicated by the scale 19 and arrow 20.

Referring to Fig. 2 of the drawing, a typical cathode ray tube display in accordance with the principles of this invention is shown wherein the figure of eight pattern due to the known direction finder system is shown detecting a signal source at approximately 135° or its reciprocal 315°, the ambiguity being resolved by any well-known direction finder technique. Before any adjustment of the relative phasing of the marker pulse generator 14 and the drive means 7 is made the marker pulse generator output coupled to the deflection coils 4 and 5 cause a linear radial trace 22 and 23 to be imposed on the figure of eight trace. By rotating a scaler indication wheel 19 the linear trace 22 and 23 is moved to positions 22' and 23' as indicated in Fig. 3, thus making the figure of eight pattern far more easily read and providing a mechanical bearing indication which is determined by the position of scaler 19 relative to arrow 20. This relative position of wheel 19 and indicating arrow 20 may be remotely telemetered to any point by any of means well known to the prior art.

The illustrations in Figs. 2 and 3 are not intended to have any exact quantitative significance, but are merely shown as an aid in describing the operation of the system mentioned herein.

While I have described the details of the embodiments of my invention, it will be apparent to those versed in the art that many changes may be made in these details without departing from the teachings thereof. For example, a sensing arrangement may be incorporated in the equipment herein described in a manner which will be apparent to those skilled in the art of direction finder systems. Accordingly while I have described above the principle of my invention in connection with specific apparatus it is to be clearly understood that this description is made only by way of example and not as a limitation on the scope of my invention as defined in the accompanying claims.

I claim:

1. A display arrangement for a cathode ray tube indicator comprising a first means for producing a rotating field in said indicator to deflect the beam of said tube from the center of the screen and rotate it in a circle, a source of input signals, means responsive to said input signals to deflect said beam to produce an angularly disposed pattern on the screen of said cathode ray tube, a second means for producing a deflection voltage for said beam in synchronism with said rotating field to superimpose on said pattern a pip indication and means to vary the phasing of one of said first and second means with respect to the other thereby varying the angular location of said indication on the screen of said tube relative to said pattern.

2. In a radio direction finding system including directive antenna means and drive means to angularly vary the radiation pattern of said directive antenna means, apparatus for indicating the bearing of a signal source comprising a cathode ray tube having electron beam forming means, deflection means for said electron beam and a screen responsive to the impingement of said electron beam, first means responsive to said drive means for rotating said deflection means to produce a rotating field in said cathode ray tube to deflect the beam of said tube from the center of the screen and rotate it in a circle in synchronism with the rotation of said radiation pattern, means responsive to the reception of signals from said signal source to produce an indicating voltage, means coupling said indicating voltage to said deflection means to cause a radial deflection of said electron beam and produce a bearing pattern on the screen of said cathode ray tube, second means responsive to said drive means for producing a relatively sharp deflection voltage for said electron beam in synchronism with said rotating field and coupled to said deflection means to superimpose a thin line trace on said bearing pattern on the screen of said tube and means for varying the relative phasing of said drive means and said second means to vary the angular displacement of said thin line trace and align it with said bearing pattern.

3. In a radio direction finding system including directive antenna means, drive means to angularly vary the radiation pattern of said directive antenna means, means coupled to said antenna for receiving energy transmitted from a signal source and cathode ray tube indicating means to indicate the bearing of said signal source having electron beam forming means, deflection means for said electron beam and a luminescent screen, means coupling said deflection means with said drive means for synchronism operation; first means for producing a relatively sharp deflection voltage, means to couple said deflection voltage to said deflection means to cause a circular sweep of said electron beam, means responsive to said received energy to produce an indicating voltage, means for coupling said indicating voltage to said deflection means to produce an angularly disposed bearing pattern on the screen of said cathode ray tube, second means responsive to said drive means for producing a thin line trace superimposed on said bearing pattern on said screen in synchronism with said circular sweep and means for varying the phasing of said drive means and said second means to align said thin line trace and said angular bearing pattern.

4. In a radio direction finding system including directive antenna means and drive means to angularly vary the radiation pattern of said directive antenna means; apparatus for indicating the bearing of a signal source comprising a cathode ray tube having electron beam forming means, beam deflection means, and a luminescent screen, first means coupling said deflection means to said drive means for producing a rotating field in said cathode ray tube to deflect the beam of said tube from the center of the screen and rotate it in a circle in synchronism with the rotation of said radiation pattern, means coupled to said antenna and responsive to the signals from said signal source to produce an indicating voltage, means for coupling said indicating voltage to said deflection means to produce an angularly disposed bearing pattern on the screen of said cathode ray tube, pulse generating means responsive to said drive means for producing a pulsed deflection voltage for said cathode ray in synchronism with said rotating field, means coupling said pulse voltage to said deflection means to produce a thin line trace superimposed on said bearing pattern on the screen of said tube and means for varying the phasing of said pulse generating means and said drive means to cause the alignment of said angularly disposed bearing pattern and said thin line trace.

5. Apparatus according to claim 4 which further includes scaler means to indicate the relative phasing between said pulse generating means and said drive means.

6. A display arrangement for a cathode ray tube indicator comprising deflection means for producing a rotating field in said indicator to deflect the beam of said tube from the center of the screen and rotate it in a circle, a source of input signals, means to apply said input signals to said deflection means to deflect said beam to produce an angularly disposed pattern on the screen of said cathode ray tube, a pulse forming unit having a rotatable element and a pickup element, drive means in synchronism with said rotating field to rotate said rotatable element, means coupling said pickup element to said deflection means for producing a deflection voltage for said beam to superimpose on said pattern a pip indication on said screen and means to vary the phasing of said pickup element with respect to said rotatable element thus varying angular location of said pip indication on the screen of said tube relative to said pattern.

7. A display arrangement for a cathode ray tube indicator comprising deflection means including a rotatable element for producing a rotating field in said indicator to deflect the beam of said tube from the center of the screen and rotate it in a circle, a source of input signals, means to apply said input signals to said deflection means to deflect said beam to produce an angularly disposed pattern on the screen of said cathode ray tube, a rotatable element drive means in synchronism with said rotating field to rotate said rotatable element, an adjustable magnetic field device coupled to said rotatable element including pickup means to produce a deflection voltage for said beam thereby to superimpose on said pattern a pip indication on said screen and to vary through adjustment of said magnetic field device with respect to said rotatable element the angular location of said pip indication on said screen of said tube relative to said pattern.

References Cited in the file of this patent

UNITED STATES PATENTS

| | | |
|---|---|---|
| 2,026,359 | Pickard | Dec. 31, 1935 |
| 2,272,607 | Higonnet | Feb. 10, 1942 |
| 2,447,728 | Bartholy | Aug. 24, 1948 |